United States Patent [19]
Tojo

[11] 4,251,131
[45] Feb. 17, 1981

[54] MICROSCOPE OBJECTIVE

[75] Inventor: Tsutomu Tojo, Hachiouji, Japan

[73] Assignee: Olympus Optical Co., Ltd., Tokyo, Japan

[21] Appl. No.: 933,910

[22] Filed: Aug. 15, 1978

[30] Foreign Application Priority Data

Aug. 23, 1977 [JP] Japan .................. 52/100156

[51] Int. Cl.³ .................................. G02B 9/34
[52] U.S. Cl. ............................ 350/414; 350/469
[58] Field of Search ............ 350/175 ML, 176, 177, 350/220

[56] References Cited
U.S. PATENT DOCUMENTS

| 3,297,393 | 1/1967 | Ziegler | 350/220 X |
| 3,902,791 | 9/1975 | Shoemaker | 350/175 ML |

*Primary Examiner*—Paul A. Sacher
*Attorney, Agent, or Firm*—Cushman, Darby & Cushman

[57] ABSTRACT

An achromat microscope objective with high magnification comprising a first, second, third and fourth lens components, the first lens component being a comparatively thick meniscus lens, the second lens component being a positive meniscus lens with comparatively small thickness, the third lens component being a cemented doublet, the fourth lens component being a cemented doublet, aberrations especially astigmatic difference and curvature of field of the microscope objective being corrected favorably.

6 Claims, 5 Drawing Figures

MICROSCOPE OBJECTIVE

BACKGROUND OF THE INVENTION (a) Field of the invention

The present invention relates to a microscope objective and, more particularly, to an achromat microscope objective with high magnification (about X60).

(b) Description of the prior art

For most of known objectives of this kind, i.e., achromat microscope objectives with magnification about X60, the astigmatic difference, flatness of image, etc. were not very favourable.

SUMMARY OF THE INVENTION

It is, therefore, a primary object of the present invention to provide a microscope objective for which the flatness of image is made more favourable by correcting the astigmatic difference and curvature of field more favourably compared with known achromat microscope objectives with high magnification.

The microscope objective according to the present invention has four-component six-element lens configuration as shown in FIG. 1 and comprises a first, second, third and fourth lens components in which the first lens component is a comparatively thick meniscus lens arranged concave toward the object side, the second lens component is a positive meniscus lens with comparatively small thickness, the third lens component is a cemented doublet, and the fourth lens component is also a cemented doublet arranged at a comparatively large distance from the third lens component. Besides, the microscope objective according to the present invention satisfies the following conditions:

$$0.2f \leq d_0 + \frac{d_1}{n_1} + d_2 \leq 0.9f \quad (1)$$

(2) $0.25 \leq r_2/r_1 \leq 1.3$
(3) $50 \leq |(\nu_4 - \nu_3) + (\nu_6 - \nu_5)| \leq 85$
(4) $1.65 < n_1 < 1.85$ wherein reference symbols $r_1$ and $r_2$ respectively represent radii of curvature of respective surfaces of the first lens component, reference symbol $d_0$ represents the distance from the object to the first lens component of the lens system (working distance), reference symbol $d_1$ represents the thickness of the first lens component, reference symbol $d_2$ represents the airspace between the first and second lens components, reference symbol $n_1$ represents the refractive index of the first lens component, reference symbols $\nu_3$ and $\nu_4$ respectively represent Abbe's numbers of respective lens elements constituting the third lens component, reference symbols $\nu_5$ and $\nu_6$ respectively represents Abbe's numbers of respective lens elements constituting the fourth lens component, and reference symbol f represents the focal length of the lens system as a whole.

Out of the above conditions, the condition (1) is established for the purpose of favourably correcting curvature of field and coma. If the value defined by the condition (1) becomes larger than the upper limit, curvature of field will be undercorrected and coma due to oblique rays will be overcorrected. If the value defined by the condition (1) becomes smaller than the lower limit, curvature of field will be overcorrected and coma will be undercorrected.

The condition (2) defines the refractive power of the first lens component, which is a meniscus lens and is established for the purpose of thereby correcting Petzval's sum in order to eliminate curvature of field and favourably correcting spherical aberration and coma of the lens system as a whole. If $r_2/r_1$ becomes larger than the upper limit of the condition (2), curvature of field will be overcorrected and coma will be undercorrected. If $r_2/r_1$ becomes smaller than the lower limit of the condition (2), curvature of field will be undercorrected and coma will be overcorrected.

The condition (3) defines the difference between dispersion of the third lens component and dispersion of the fourth lens component and is established for the purpose of thereby balancing longitudinal chromatic aberration and lateral chromatic aberration. If the value defined by the condition (3) becomes larger than the upper limit, lateral chromatic aberration will be overcorrected when longitudinal chromatic aberration is corrected favourably and, as a result, large chromatic aberration will occur on the image surface. Consequently, the image will look as if flare were caused and contrast of image will become considerably unfavourable. If the value defined by the condition (3) becomes smaller than the lower limit, lateral chromatic aberration will be considerably undercorrected when longitudinal chromatic aberration is corrected favourably.

The condition (4) is to correct spherical aberration favourably by using the glass material with comparatively high refractive index for the front lens. If $n_1$ becomes smaller than the lower limit of the condition (4), radii of curvature of front lens surfaces become small. As a result, the front lens causes very large chromatic aberration, which cannot be favourably corrected by the second through fourth lens components, and this is not preferable. If $n_1$ becomes larger than the upper limit of the condition (4), radii of curvature of front lens surfaces become large. Though this is preferable for the correction of spherical aberration, it will become impossible to favourably correct the other aberrations by the front lens because the refractive power of front lens becomes weak.

It is more preferable to arrange so that the microscope objective according to the present invention satisfies the following conditions and (5) and (6) in addition to the abovementioned conditions (1) through (4):

(5) $0.2 < r_4/r_3 < 1.2$
(6) $f < d_7 < 2.5f$ wherein reference symbols $r_3$ and $r_4$ respectively represent radii of curvature of respective surfaces of the second lens component and reference symbol $d_7$ represents the airspace between the third and fourth lens components.

The condition (5) is to correct curvature of field and astigmatism in combination with the condition (2). If $r_4/r_3$ becomes larger than the upper limit of the condition (5), curvature of field will be overcorrected and zonal aberration will increase. If $r_4/r_3$ becomes smaller than the lower limit of the condition (2), curvature of field and astigmatism will be undercorrected.

The condition (6) is to correct longitudinal chromatic aberration and lateral chromatic aberration of the lens system as a whole in the well-balanced state and, moreover, the condition (6) is indispensable for favourably correcting coma of the lens system as a whole, especially, coma in the large viewing angle. If $d_7$ becomes smaller than the lower limit of the condition (6), longitudinal chromatic aberration will be aggravated and it becomes impossible to eliminate asymmetry of coma in the large viewing angle. If $d_7$ becomes larger than the upper limit of the condition (6), lateral chromatic aberration will be considerably undercorrected. Besides, vignetting of oblique rays in the large viewing angle will become considerably large and, consequently, intensity of rays in the marginal portion will become insufficient.

DETAILED DESCRIPTION OF THE PREFERRED EMBODIMENTS

Figure 1:
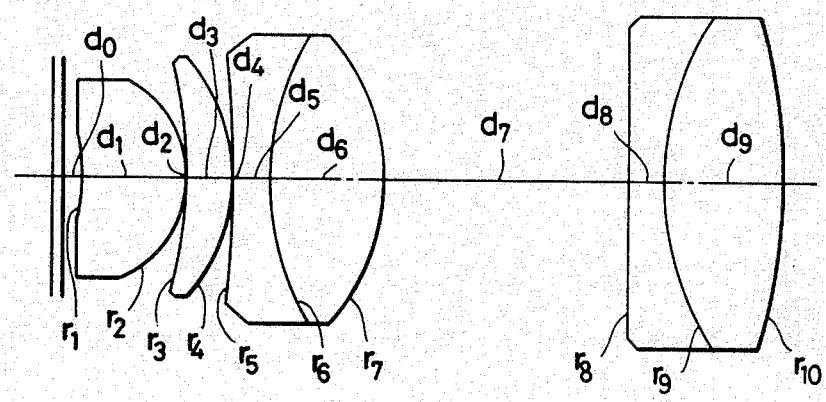
FIG. 1 shows a sectional view of the microscope objective according to the present invention.
Figure 2:
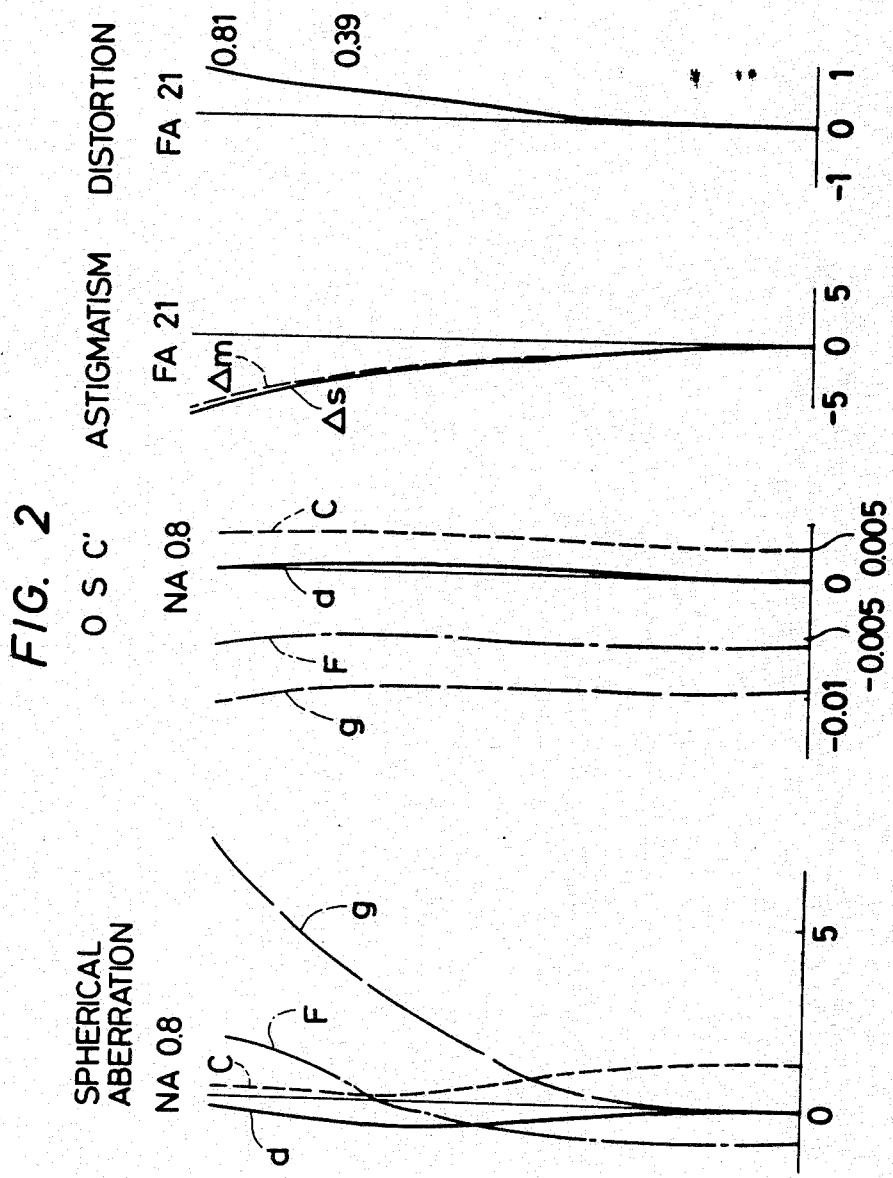
FIG. 2 shows graphs illustrating aberration curves of Embodiment 1 of the present invention.
Figure 3:
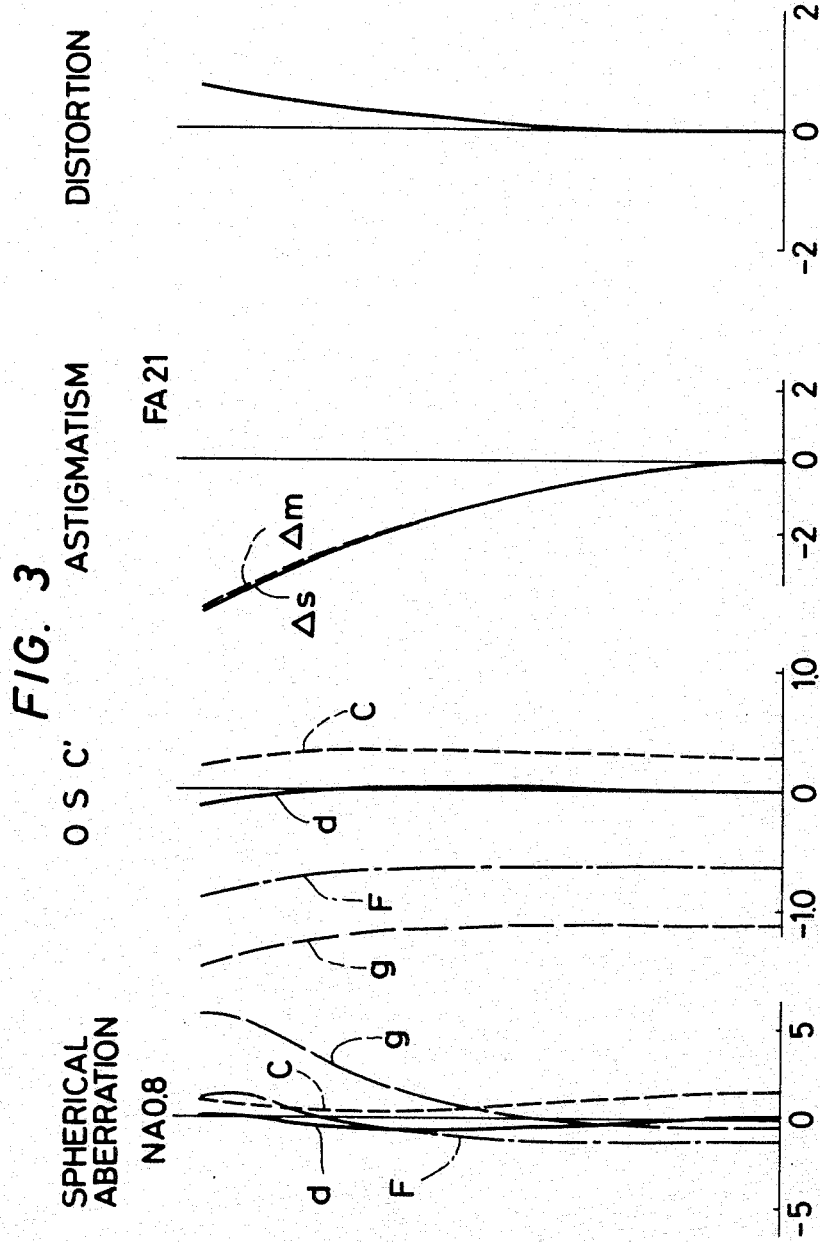
FIG. 3 shows graphs illustrating aberration curves of Embodiment 2 of the present invention.
Figure 4:
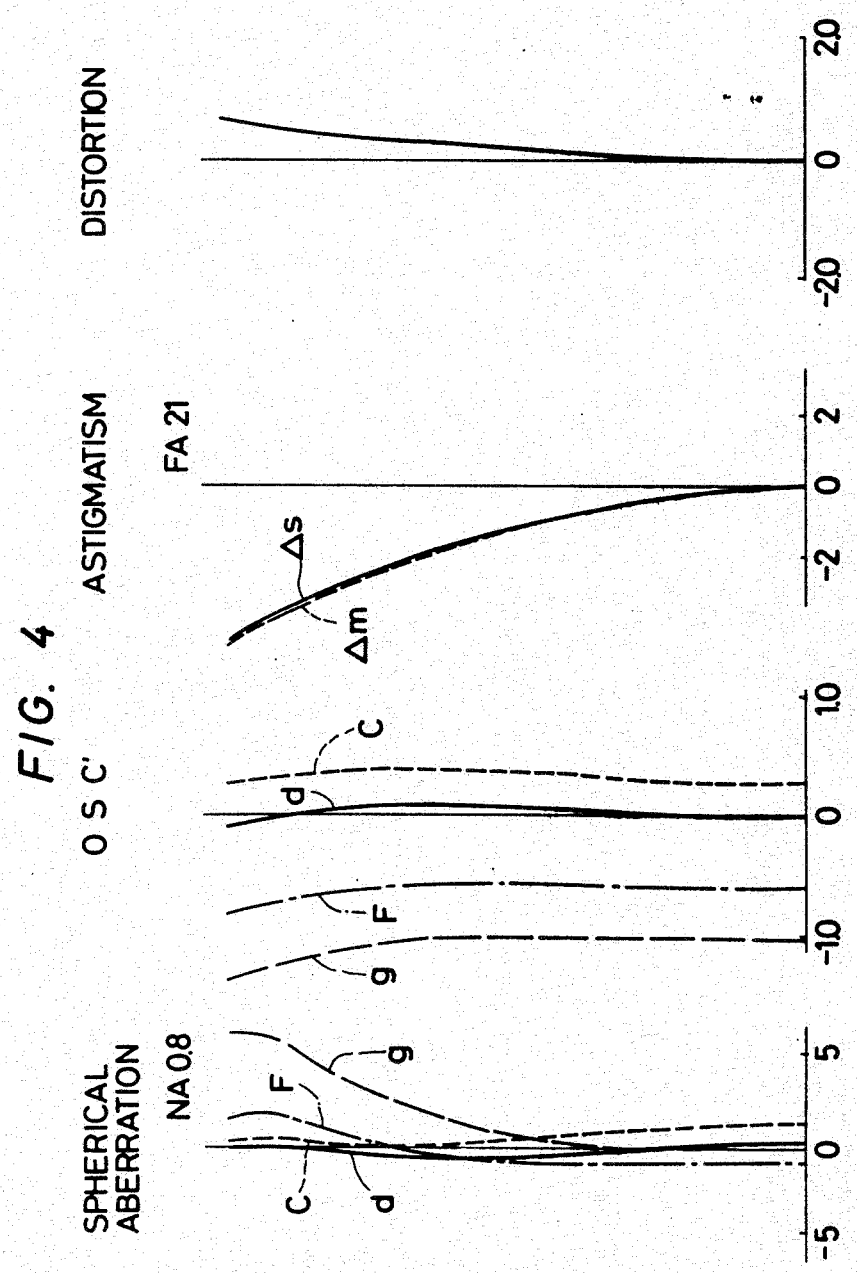
FIG. 4 shows graphs illustrating aberration curves of Embodiment 3 of the present invention.
Figure 5:
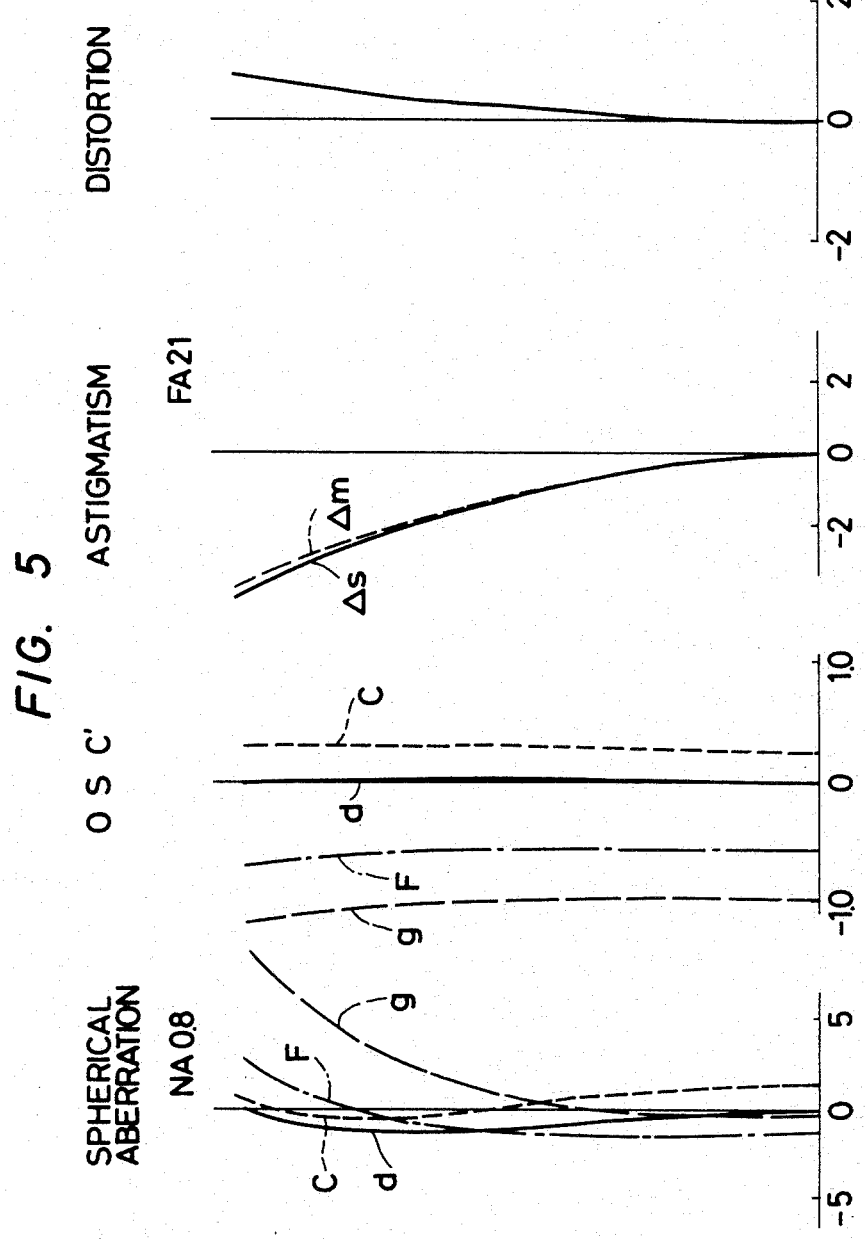
FIG. 5 shows graphs illustrating aberration curves of Embodiment 4 of the present invention.

Preferred embodiments of the microscope objective according to the present invention explained in the above are as shown below.

| Embodiment 1 | | | |
|---|---|---|---|
| $f = 1.0$ | N.A = 0.8  $\beta = -60X$ | W.D($d_0$) = 0.1048 | |
| $r_1 = -1.0407$ | | | |
| | $d_1 = 0.5525$ | $n_1 = 1.81554$ | $\nu_1 = 44.5$ |
| $r_2 = -0.6122$ | | | |
| | $d_2 = 0.0170$ | | |
| $r_3 = -2.7024$ | | | |
| | $d_3 = 0.2244$ | $n_2 = 1.78650$ | $\nu_2 = 50.2$ |
| $r_4 = -1.1285$ | | | |
| | $d_4 = 0.0339$ | | |
| $r_5 = -4.3437$ | | | |
| | $d_5 = 0.2068$ | $n_3 = 1.74077$ | $\nu_3 = 27.8$ |
| $r_6 = 1.3864$ | | | |
| | $d_6 = 0.6271$ | $n_4 = 1.48656$ | $\nu_4 = 84.5$ |
| $r_7 = -1.0905$ | | | |
| | $d_7 = 1.3458$ | | |
| $r_8 = \infty$ | | | |
| | $d_8 = 0.2102$ | $n_5 = 1.67003$ | $\nu_5 = 47.3$ |
| $r_9 = 1.6370$ | | | |
| | $d_9 = 0.6339$ | $n_6 = 1.51190$ | $\nu_6 = 58.1$ |
| $r_{10} = -2.7881$ | | | |

| Embodiment 2 | | | |
|---|---|---|---|
| $f = 1.0$ | N.A = 0.8  $\beta = -60X$ | W.D($d_0$) = 0.1058 | |
| $r_1 = -1.0271$ | | | |
| | $d_1 = 0.5524$ | $n_1 = 1.80400$ | $\nu_1 = 46.57$ |
| $r_2 = -0.6146$ | | | |
| | $d_2 = 0.0192$ | | |
| $r_3 = -2.5224$ | | | |
| | $d_3 = 0.2235$ | $n_2 = 1.69350$ | $\nu_2 = 50.81$ |
| $r_4 = -1.0386$ | | | |
| | $d_4 = 0.0383$ | | |
| $r_5 = -4.5198$ | | | |
| | $d_5 = 0.1980$ | $n_3 = 1.71736$ | $\nu_3 = 29.51$ |
| $r_6 = 1.3688$ | | | |
| | $d_6 = 0.6258$ | $n_4 = 1.49700$ | $\nu_4 = 81.60$ |
| $r_7 = -1.1232$ | | | |
| | $d_7 = 1.3442$ | | |
| $r_8 = -65.8761$ | | | |
| | $d_8 = 0.2075$ | $n_5 = 1.63930$ | $\nu_5 = 44.88$ |
| $r_9 = 1.5089$ | | | |
| | $d_9 = 0.6322$ | $n_6 = 1.51190$ | $\nu_6 = 58.14$ |
| $r_{10} = -2.8432$ | | | |

| Embodiment 3 | | | |
|---|---|---|---|
| $f = 1.0$ | N.A = 0.8  $\beta = -60X$ | W.D($d_0$) = 0.1048 | |
| $r_1 = -1.0329$ | | | |
| | $d_1 = 0.5522$ | $n_1 = 1.80400$ | $\nu_1 = 46.57$ |
| $r_2 = -0.6238$ | | | |
| | $d_2 = 0.0169$ | | |
| $r_3 = -2.8716$ | | | |
| | $d_3 = 0.2236$ | $n_2 = 1.69350$ | $\nu_2 = 50.81$ |
| $r_4 = -1.0070$ | | | |
| | $d_4 = 0.0339$ | | |
| $r_5 = -3.7298$ | | | |
| | $d_5 = 0.2066$ | $n_3 = 1.71736$ | $\nu_3 = 29.51$ |
| $r_6 = 1.3402$ | | | |
| | $d_6 = 0.6266$ | $n_4 = 1.49700$ | $\nu_4 = 81.60$ |
| $r_7 = -1.1258$ | | | |
| | $d_7 = 1.3446$ | | |
| $r_8 = 260.9195$ | | | |
| | $d_8 = 0.2076$ | $n_5 = 1.61340$ | $\nu_5 = 43.84$ |
| $r_9 = 1.4548$ | | | |
| | $d_9 = 0.6337$ | $n_6 = 1.50137$ | $\nu_6 = 56.40$ |
| $r_{10} = -2.9949$ | | | |

| Embodiment 4 | | | |
|---|---|---|---|
| $f = 1.0$ | N.A = 0.8  $\beta = -60X$ | W.D($d_0$) = 0.1047 | |
| $r_1 = -1.0399$ | | | |
| | $d_1 = 0.5520$ | $n_1 = 1.81554$ | $\nu_1 = 44.45$ |
| $r_2 = -0.6121$ | | | |
| | $d_2 = 0.0169$ | | |
| $r_3 = -2.6708$ | | | |
| | $d_3 = 0.2235$ | $n_2 = 1.7725$ | $\nu_2 = 49.60$ |
| $r_4 = -1.1306$ | | | |
| | $d_4 = 0.0338$ | | |
| $r_5 = -4.2516$ | | | |
| | $d_5 = 0.2066$ | $n_3 = 1.74077$ | $\nu_3 = 27.79$ |
| $r_6 = 1.3774$ | | | |
| | $d_6 = 0.6264$ | $n_4 = 1.49700$ | $\nu_4 = 81.60$ |
| $r_7 = -1.0904$ | | | |
| | $d_7 = 1.3442$ | | |
| $r_8 = -1055.1261$ | | | |
| | $d_8 = 0.2075$ | $n_5 = 1.67003$ | $\nu_5 = 47.25$ |
| $r_9 = 1.6402$ | | | |
| | $d_9 = 0.6335$ | $n_6 = 1.51190$ | $\nu_6 = 58.14$ |
| $r_{10} = 2.7727$ | | | |

In the above embodiments, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

I claim:

1. A microscope objective comprising a first, second, third and fourth lens components, said first lens component being a comparatively thick positive meniscus lens arranged concave toward the object side, said second lens component being a positive meniscus lens with comparatively small thickness arranged concave toward the object side, said third lens component being a positive cemented doublet, said fourth lens component being a positive cemented doublet, said microscope objective satisfying the following conditions:

$$0.42f \leq d_0 + \frac{d_1}{n_1} + d_2 \leq 0.44f \qquad (1)$$

(2) $0.58 \leq r_2/r_1 \leq 0.61$
(3) $50 \leq |(\nu_4-\nu_3)+(\nu_6-\nu_5)| \leq 85$
(4) $1.8 < n_1 < 1.82$ wherein reference symbols $r_1$ and $r_2$ respectively represent radii of curvature of surfaces on the object side and image side of the first lens component, reference symbol $d_0$ represents the distance from the object to the first lens component of the lens system, reference symbol $d_1$ represents the thickness of the first lens component, reference symbol $d_2$ represents the airspace between the first and second lens components, reference symbol $n_1$ represents the refractive index of the first lens component, reference symbols $\nu_3$ and $\nu_4$ respectively represent Abbe's numbers of respective lens elements constituting the third lens component, reference symbols $\nu_5$ and $\nu_6$ respectively represent Abbe's numbers of respective lens elements constituting the fourth lens component, and reference symbol f represents the focal length of the lens system as a whole.

2. A microscope objective according to claim 1 further satisfying the following conditions:

(5) $0.35 < r_4/r_3 < 0.43$
(6) $1.3f < d_7 < 1.4f$ wherein reference symbols $r_3$ and $r_4$ respectively represent radii of curvature of surfaces on the object side and image side of the second lens component, and reference symbol $d_7$ represents the airspace between the third and fourth lens components.

3. A microscope objective according to claim 2, in which said microscope objective has the following numerical data:

| $f = 1.0$ | N.A = 0.8 | $\beta = -60X$ | $W.D(d_0) = 0.1048$ |
|---|---|---|---|
| $r_1 = -1.0407$ | | | |
| | $d_1 = 0.5525$ | $n_1 = 1.81554$ | $\nu_1 = 44.5$ |
| $r_2 = -0.6122$ | | | |
| | $d_2 = 0.0170$ | | |
| $r_3 = -2.7024$ | | | |
| | $d_3 = 0.2244$ | $n_2 = 1.78650$ | $\nu_2 = 50.2$ |
| $r_4 = -1.1285$ | | | |
| | $d_4 = 0.0339$ | | |
| $r_5 = -4.3437$ | | | |
| | $d_5 = 0.2068$ | $n_3 = 1.74077$ | $\nu_3 = 27.8$ |
| $r_6 = 1.3864$ | | | |
| | $d_6 = 0.6271$ | $n_4 = 1.48656$ | $\nu_4 = 84.5$ |
| $r_7 = -1.0905$ | | | |
| | $d_7 = 1.3458$ | | |
| $r_8 = \infty$ | | | |
| | $d_8 = 0.2102$ | $n_5 = 1.67003$ | $\nu_5 = 47.3$ |
| $r_9 = 1.6370$ | | | |
| | $d_9 = 0.6339$ | $n_6 = 1.51190$ | $\nu_6 = 58.1$ |
| $r_{10} = -2.7881$ | | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

4. A microscope objective according to claim 2, in which said microscope objective has the following numerical data:

| $f = 1.0$ | N.A = 0.8 | $\beta = -60X$ | $W.D(d_0) = 0.1058$ |
|---|---|---|---|
| $r_1 = -1.0271$ | | | |
| | $d_1 = 0.5524$ | $n_1 = 1.80400$ | $\nu_1 = 46.57$ |
| $r_2 = -0.6146$ | | | |
| | $d_2 = 0.0192$ | | |
| $r_3 = -2.5224$ | | | |
| | $d_3 = 0.2235$ | $n_2 = 1.69350$ | $\nu_2 = 50.81$ |
| $r_4 = -1.0386$ | | | |
| | $d_4 = 0.0383$ | | |
| $r_5 = -4.5198$ | | | |
| | $d_5 = 0.1980$ | $n_3 = 1.71736$ | $\nu_3 = 29.51$ |
| $r_6 = 1.3688$ | | | |
| | $d_6 = 0.6258$ | $n_4 = 1.49700$ | $\nu_4 = 81.60$ |
| $r_7 = -1.1232$ | | | |
| | $d_7 = 1.3442$ | | |
| $r_8 = -65.8761$ | | | |
| | $d_8 = 0.2075$ | $n_5 = 1.63930$ | $\nu_5 = 44.88$ |
| $r_9 = 1.5089$ | | | |
| | $d_9 = 0.6322$ | $n_6 = 1.51190$ | $\nu_6 = 58.14$ |

-continued

| $f = 1.0$ | N.A = 0.8 | $\beta = -60X$ | $W.D(d_0) = 0.1058$ |
|---|---|---|---|
| $r_{10} = -2.8432$ | | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

5. A microscope objective according to claim 2, in which said microscope objective has the following numerical data:

| $f = 1.0$ | N.A = 0.8 | $\beta = -60X$ | $W.D(d_0) = 0.1048$ |
|---|---|---|---|
| $r_1 = -1.0329$ | | | |
| | $d_1 = 0.5522$ | $n_1 = 1.80400$ | $\nu_1 = 46.57$ |
| $r_2 = -0.6238$ | | | |
| | $d_2 = 0.0169$ | | |
| $r_3 = -2.8716$ | | | |
| | $d_3 = 0.2236$ | $n_2 = 1.69350$ | $\nu_2 = 50.81$ |
| $r_4 = -1.0070$ | | | |
| | $d_4 = 0.0339$ | | |
| $r_5 = -3.7298$ | | | |
| | $d_5 = 0.2066$ | $n_3 = 1.71736$ | $\nu_3 = 29.51$ |
| $r_6 = 1.3402$ | | | |
| | $d_6 = 0.6266$ | $n_4 = 1.49700$ | $\nu_4 = 81.60$ |
| $r_7 = -1.1258$ | | | |
| | $d_7 = 1.3446$ | | |
| $r_8 = 260.9195$ | | | |
| | $d_8 = 0.2076$ | $n_5 = 1.61340$ | $\nu_5 = 43.84$ |
| $r_9 = 1.4548$ | | | |
| | $d_9 = 0.6337$ | $n_6 = 1.50137$ | $\nu_6 = 56.40$ |
| $r_{10} = -2.9949$ | | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

6. A microscope objective according to claim 2, in which said microscope objective has the following numerical data:

| $f = 1.0$ | N.A = 0.8 | $\beta = -60X$ | $W.D(d_0) = 0.1047$ |
|---|---|---|---|
| $r_1 = -1.0399$ | | | |
| | $d_1 = 0.5520$ | $n_1 = 1.81554$ | $\nu_1 = 44.45$ |
| $r_2 = -0.6121$ | | | |
| | $d_2 = 0.0169$ | | |
| $r_3 = -2.6708$ | | | |
| | $d_3 = 0.2235$ | $n_2 = 1.7725$ | $\nu_2 = 49.60$ |
| $r_4 = -1.1306$ | | | |
| | $d_4 = 0.0338$ | | |
| $r_5 = -4.2516$ | | | |
| | $d_5 = 0.2066$ | $n_3 = 1.74077$ | $\nu_3 = 27.79$ |
| $r_6 = 1.3774$ | | | |
| | $d_6 = 0.6264$ | $n_4 = 1.49700$ | $\nu_4 = 81.60$ |
| $r_7 = -1.0904$ | | | |
| | $d_7 = 1.3442$ | | |
| $r_8 = -1055.1261$ | | | |
| | $d_8 = 0.2075$ | $n_5 = 1.67003$ | $\nu_5 = 47.25$ |
| $r_9 = 1.6402$ | | | |
| | $d_9 = 0.6335$ | $n_6 = 1.51190$ | $\nu_6 = 58.14$ |
| $r_{10} = 2.7727$ | | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

* * * * *